United States Patent
Kim et al.

(10) Patent No.: US 8,460,830 B2
(45) Date of Patent: Jun. 11, 2013

(54) ELECTROLYTE FOR RECHARGEABLE LITHIUM BATTERY AND RECHARGEABLE LITHIUM BATTERY INCLUDING THE SAME

(75) Inventors: Jin-Sung Kim, Suwon-si (KR); Na-Rae Park, Suwon-si (KR); Su-Hee Han, Suwon-si (KR); Jin-Hyunk Lim, Suwon-si (KR); Mi-Hyeun Oh, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 713 days.

(21) Appl. No.: 12/623,314

(22) Filed: Nov. 20, 2009

(65) Prior Publication Data

US 2010/0255370 A1   Oct. 7, 2010

(30) Foreign Application Priority Data

Apr. 1, 2009  (KR) .................... 10-2009-0028124

(51) Int. Cl.
*H01M 6/14* (2006.01)
(52) U.S. Cl.
USPC ........... 429/302; 429/307; 429/330; 429/338; 429/200; 429/199; 252/62.2
(58) Field of Classification Search
USPC .. 429/302, 307, 330, 338, 200, 199; 252/62.2
See application file for complete search history.

(56) References Cited

U.S. PATENT DOCUMENTS

2010/0015514 A1   1/2010   Miyagi et al.

FOREIGN PATENT DOCUMENTS

| JP | 2002-313416 | 10/2002 |
| JP | 2007-123097 | 5/2007 |
| JP | 2007-184257 A | 7/2007 |
| JP | 2008-146930 | 6/2008 |

OTHER PUBLICATIONS

KIPO Notice of Allowance dated Nov. 16, 2010 for Korean Application No. 9-5-2010-051948486.

*Primary Examiner* — Laura Weiner
(74) *Attorney, Agent, or Firm* — Knobbe Martens Olson & Bear LLP

(57) ABSTRACT

Disclosed is an electrolyte for a rechargeable lithium battery and a rechargeable lithium battery including the same. The electrolyte includes a lithium salt, trialkylsilyl(meth)acrylate compound represented by the following Chemical Formula 1, a halogenated carbonate compound, and an organic solvent.

Chemical Formula 1

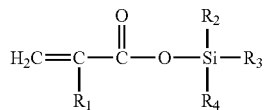

In the above Chemical Formula 1, $R_1$ is hydrogen or methyl, and $R_2$ to $R_4$ are the same or different and one selected from C1 to C6 alkyl.

17 Claims, 3 Drawing Sheets

US 8,460,830 B2

ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2009-0028124 filed in the Korean Intellectual Property Office on Apr. 1, 2009, the entire contents of which are incorporated herein by reference.

BACKGROUND OF THE INVENTION

1. Field of the Invention

This disclosure relates to an electrolyte for a rechargeable lithium battery and a rechargeable lithium battery including the same.

2. Description of the Related Art

Batteries transform chemical energy generated from an electrochemical oxidation-reduction reaction of chemical materials inside the battery into electrical energy. The batteries are divided into primary batteries, which should be discarded after the energy inside the batteries is consumed, and rechargeable batteries, which can be recharged multiple times.

Among the batteries, the rechargeable battery can charge/discharge multiple times through reversible transformation between chemical energy and electrical energy.

Recent development in high-end electronic industries has made electronic devices smaller and lighter and this has lead to an increase in portable electronic devices.

Since the portable electronic devices demand batteries with high energy density, researchers are studying vigorously to develop rechargeable lithium batteries.

The rechargeable lithium battery is fabricated by injecting electrolyte into a battery cell, which includes a positive electrode including a positive active material capable of intercalating/deintercalating lithium ions and a negative electrode including a negative active material capable of intercalating/deintercalating lithium ions. The electrolyte significantly affects the performance of the rechargeable lithium battery.

SUMMARY OF THE INVENTION

One aspect of the present embodiments provides an electrolyte for a rechargeable lithium battery being capable of maintaining high-capacity after repetitive charge and discharge and improving cycle-life characteristics at high temperature.

Another aspect of the present embodiments provides a rechargeable lithium battery including the electrolyte.

According to one aspect of the present embodiments, an electrolyte for a rechargeable lithium battery is provided that includes a lithium salt, a trialkylsilyl(meth)acrylate compound represented by the following Chemical Formula 1, a halogenated carbonate compound, and an organic solvent.

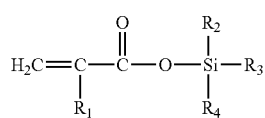

Chemical Formula 1

In the above Chemical Formula 1, $R_1$ is hydrogen or methyl, and $R_2$ to $R_4$ are the same or different and each selected from a $C_1$ to $C_6$ alkyl.

The trialkylsilyl(meth)acrylate compound may include trimethylsilylacrylate represented by the following Chemical Formula 2.

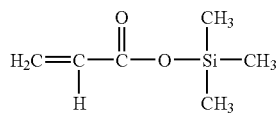

Chemical Formula 2

The halogenated carbonate compound may include fluoroethylene carbonate.

The trialkylsilyl(meth)acrylate compound may be included in an amount of about 0.1 to about 5 wt % based on the total weight of the electrolyte.

The halogenated carbonate compound may be included in an amount of about 0.1 to about 10 wt % based on the total weight of the electrolyte.

According to another aspect of the present embodiments, a rechargeable lithium battery is provided that includes a positive electrode, a negative electrode, and an electrolyte including a lithium salt, a trialkylsilyl(meth)acrylate compound represented by the Chemical Formula 1, a halogenated carbonate compound, and an organic solvent.

The trialkylsilyl(meth)acrylate compound may include trimethylsilylacrylate represented by the Chemical Formula 2.

The rechargeable lithium battery according to the present embodiments has high capacity retention after repetitive charge and discharge and high capacity after storage at a high temperature for a long time.

DETAILED DESCRIPTION OF THE INVENTION

Figure 1:
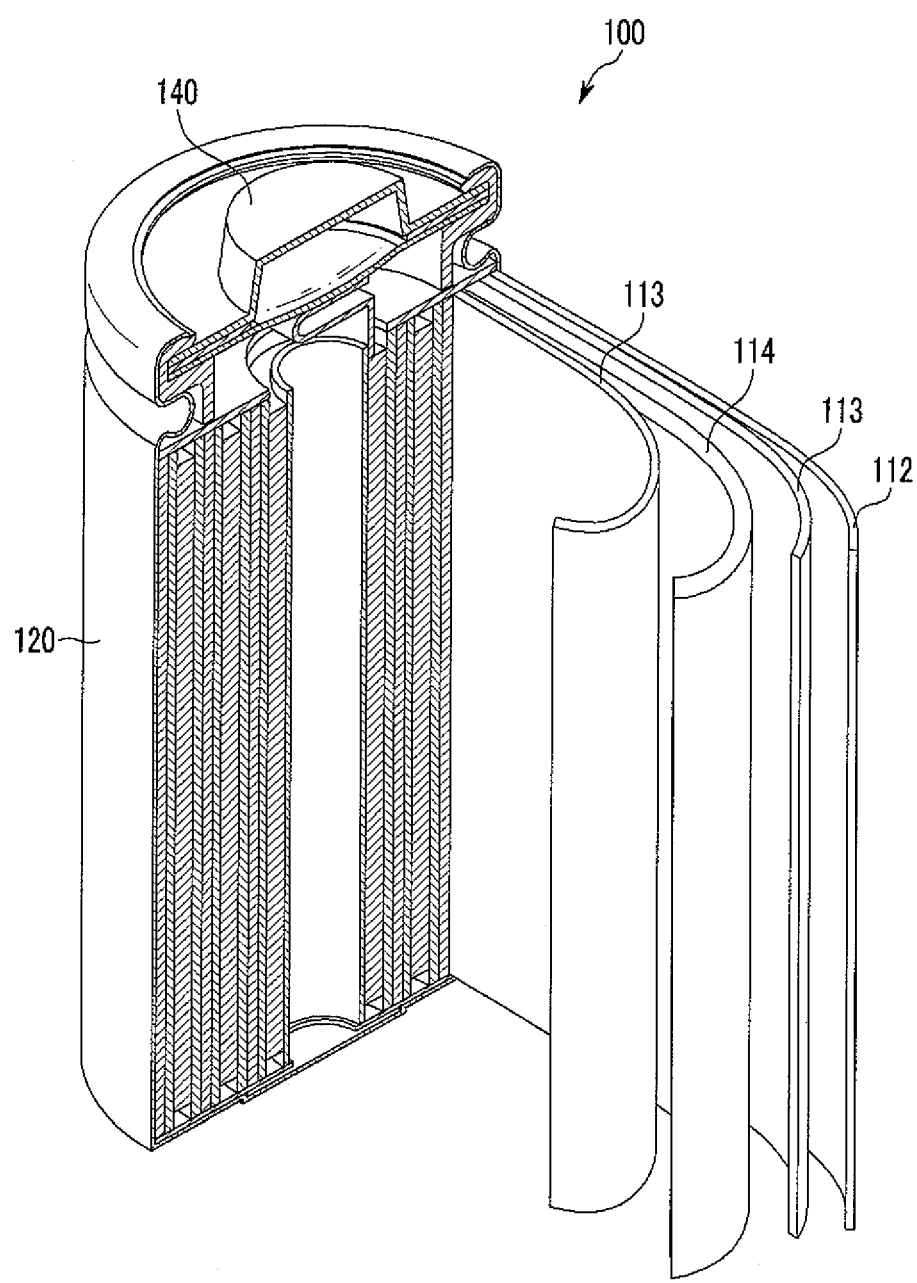
FIG. 1 is a schematic view showing a rechargeable lithium battery according to one embodiment.

The present embodiments will, be described more fully hereinafter with reference to the accompanying drawings, in which exemplary embodiments are shown. As those skilled in the art would realize, the described embodiments may be modified in various different ways, all without departing from the spirit or scope of the present embodiments.

The electrolyte for a rechargeable lithium battery according to one embodiment includes a lithium salt, a trialkylsilyl (meth)acrylate compound, a halogenated carbonate compound, and an organic solvent.

Lithium salts supplies lithium ions in the battery, and operate a basic operation of a rechargeable lithium battery. The lithium salts used are not limited. Preferably, the lithium salts release lithium ions in an electrolyte. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are natural number, LiCl, LiI, or combinations thereof. In one embodiment, LiPF$_6$, LiBF$_4$, LiAsF$_6$, LiClO$_4$, LiN(CF$_3$SO$_2$)$_2$, LiN(C$_2$F$_5$SO$_2$)$_2$, CF$_3$SO$_3$Li, or combinations thereof may be used.

The lithium salt may be used at a concentration of from about 0.1 to about 2.0M. When the lithium salt is included at the above concentration range, lithium ion mobility may be enhanced due to appropriate electrolyte viscosity.

The trialkylsilyl(meth)acrylate compound may be represented by the following Chemical Formula 1.

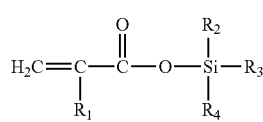

Chemical Formula 1

In the Chemical Formula 1, R$_1$ is hydrogen or methyl, and R$_2$ to R$_4$ are the same or different and each selected from C$_1$ to C$_6$ alkyl.

The trialkylsilyl(meth)acrylate compound may include trimethylsilylacrylate having hydrogen for R$_1$ and methyl for R$_2$ to R$_4$, in the Chemical Formula 1, and is represented by the following Chemical Formula 2.

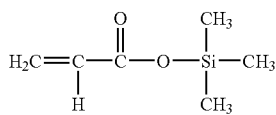

Chemical Formula 2

The trialkylsilyl(meth)acrylate compound inhibits degradation of electrolyte characteristics, and thereby prevents decrease of battery capacity after repetitive charge and discharge resulting in improvement of cycle-life characteristics and capacity retention.

The trialkylsilyl(meth)acrylate compound may be included in an amount of from about 0.1 to about 5 wt % based on the total amount of the electrolyte. The present embodiments make it possible to improve cycle-life and capacity retention of rechargeable lithium batteries.

The halogenated carbonate compound is an additive for improving electrolyte performance, and includes, for example, fluoroethylene carbonate (FEC).

The halogenated carbonate compound may be included in an amount of from about 1 to about 10 wt % based on the total amount of the electrolyte. The present embodiments make it possible to improve long-term cycle-life characteristics as well as cycle-life characteristics.

The organic solvent acts as a medium for transmitting lithium ions, and examples of the organic solvent include for example, carbonate compounds, ester compounds, ether compounds, ketone compounds, and combinations thereof.

The carbonate compounds may include for example, linear carbonate compounds, cyclic carbonate compounds, and combinations thereof.

The linear carbonate compounds may include, for example, dimethyl carbonate (DMC), ethylmethyl carbonate (EMC), diethyl carbonate (DEC), dipropyl carbonate (DPC), methylpropyl carbonate (MPC), and ethylpropyl carbonate (EPC), and the cyclic carbonate compound may include, for example, ethylene carbonate (EC), propylene carbonate (PC), and butylene carbonate (BC).

When the linear carbonate compounds and cyclic carbonate compounds are mixed, an organic solvent having high dielectric constant and low viscosity can be provided. The cyclic carbonate compounds and linear carbonate compounds may be mixed together at a volume ratio of from about 1:1 to about 1:9. Examples of mixed organic solvents of linear carbonate compound and cyclic carbonate compound include a mixture including ethylene carbonate, ethylmethyl carbonate, and diethyl carbonate at a predetermined ratio.

The organic solvent may be included in a balance amount except for other components. For example, the organic solvent may be included in an amount from about 1 to about 90 wt % based on the total amount of the electrolyte.

Hereafter, a rechargeable lithium battery according to another embodiment will be described by referring to FIG. 1.

FIG. 1 is a schematic view showing a rechargeable lithium battery according to one embodiment.

Referring to FIG. 1, the rechargeable lithium battery 100 includes a battery cell including a positive electrode 114, a negative electrode 112 facing the positive electrode 114, a separator 113 interposed between the positive electrode 114 negative electrode 112 and, an electrolyte (not shown) impregnating the positive electrode 114, negative electrode 112, and separator 113, a battery case 120, and a sealing member 140 sealing the battery case 120.

The positive electrode 114 includes a current collector and a positive active material layer positioned on the current collector.

The current collector may be an aluminum foil, but is not limited thereto.

The positive active material layer includes a positive active material, a binder, and a conductive material.

For the positive active material, compounds being capable of reversibly intercalating and deintercalating lithium ions may be used without limitation. Examples of the positive active material include composite oxide include lithium (Li) and a metal for example, cobalt (Co), manganese (Mn), nickel (Ni), and combinations thereof as follows:

Li$_a$A$_{1-b}$B$_b$D$_2$ wherein, in the above formula, $0.90 \leq a \leq 1.8$, and $0 \leq b \leq 0.5$; Li$_a$E$_{1-b}$B$_b$O$_{2-c}$D$_c$ wherein, in the above formula, $0.90 \leq a \leq 1.8$, $0 \leq b \leq 0.5$, and $0 \leq c \leq 0.05$; LiE$_{2-b}$B$_b$O$_{4-c}$D$_c$ wherein, in the above formula, $0 \leq b \leq 0.5$, and $0 \leq c \leq 0.05$; Li$_a$Ni$_{1-b-c}$Co$_b$B$_c$D$_\alpha$ wherein, in the above formula, $0.90 \leq a \leq 1.8$, $0 \leq b \leq 0.5$, $0 \leq c \leq 0.05$, and $0 < a \leq 2$; Li$_a$Ni$_{1-b-c}$Co$_b$B$_c$O$_{2-\alpha}$L$_\alpha$ wherein, in the above formula, $0.90 \leq a \leq 1.8$, $0 \leq b \leq 0.5$, $0 \leq c \leq 0.05$, and $0 < a < 2$; Li$_a$Ni$_{1-b-c}$Co$_b$B$_c$O$_{2-\alpha}$L$_2$ wherein, in the above formula, $0.90 \leq a \leq 1.8$, $0 \leq b \leq 0.5$, $0 \leq c \leq 0.05$, and $0 < a < 2$; Li$_a$Ni$_{1-b-c}$Mn$_b$B$_c$D$_\alpha$ wherein, in the above formula, $0.90 \leq a \leq 1.8$, $0 \leq b \leq 0.5$, $0 \leq c \leq 0.05$, and $0 < a \leq 2$; Li$_a$Ni$_{1-b-c}$Mn$_b$B$_c$O$_{2-\alpha}$L$_\alpha$ wherein, in the above formula, $0.90 \leq a \leq 1.8$, $0 \leq b \leq 0.5$, $0 \leq c \leq 0.05$, and $0 < a < 2$; Li$_a$Ni$_{1-b-c}$Mn$_b$B$_c$O$_{2-\alpha}$L$_2$ wherein, in the above formula, $0.90 \leq a \leq 1.8$, $0 \leq b\, 0.5$, $0 \leq c \leq 0.05$, and $0 < a < 2$; Li$_a$Ni$_b$E$_c$G$_d$O$_2$ wherein, in the above formula, $0.90 \leq c \leq 1.8$, $0 \leq b \leq 0.9$, $0 \leq c \leq 0.5$, and $0.001 \leq d \leq 0.1$; Li$_a$Ni$_b$Co$_c$Mn$_d$GeO$_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$; Li$_a$NiG$_b$O$_2$ wherein, in the above formula, $0.90 \leq a \leq 1.8$, and $0.001 \leq b \leq 0.1$; Li$_a$CoG$_b$O$_2$ wherein, in the above formula, $0.90 \leq a \leq 1.8$, and $0.001 \leq b \leq 0.1$; Li$_a$MnG$_b$O$_2$ wherein, in the above formula, $0.90 \leq a \leq 1.8$, and $0.001 \leq b \leq 0.1$; Li$_a$Mn$_2$G$_b$O$_4$ wherein, in the above formula, $0.90 \leq a \leq 1.8$, and $0.001 \leq b \leq 0.1$; QO$_2$; QS$_2$; LiQS$_2$; V$_2$O$_5$; LiV$_2$O$_5$; LiIO$_2$; LiNiVO$_4$; Li$_{(3-f)}$J$_2$(PO$_4$)$_3$ ($0 \leq f \leq 2$); Li$_{(3-f)}$Fe$_2$(PO$_4$)$_3$ ($0 \leq f \leq 2$); and LiFePO$_4$.

In the above formulas, A is selected from the group consisting of Ni, Co, Mn, and combinations thereof, B is selected from the group consisting of Al, Ni, Co, Mn, Cr, Fe, Mg, Sr, V, a rare earth element, and combinations thereof, D is selected from the group consisting of O, F, S, P, and combinations thereof, E is selected from the group consisting of Co, Mn, and combinations thereof, L is selected from the group consisting of F, S, P, and combinations thereof, G is selected from the group consisting of Al, Cr, Mn, Fe, Mg, La, Ce, Sr, V, and combinations thereof, Q is selected from the group consisting of Ti, Mo, Mn, and combinations thereof, I selected from the group consisting of Cr, V, Fe, Sc, Y, and combinations thereof, and J selected from the group consisting of V, Cr, Mn, Co, Ni, Cu, and combinations thereof.

The binder improves binding properties of the positive active material particles to one another, and also with a current collector. Any material may be used for the binder without limitation. Preferably, the binder should not cause a chemical change and improve adherence. Examples of the binder include polyvinyl alcohol, carboxylmethyl cellulose, hydroxypropyl cellulose, diacetyl cellulose, polyvinyl chloride, carboxylated polyvinyl chloride, polyvinyl difluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive material is included to improve electrode conductivity. Any electrically conductive material may be used as a conductive material. Preferably the electrically conductive material does not cause a chemical change. Examples of the conductive material include polyphenylene derivatives, natural graphite, artificial graphite, carbon black, acetylene black, ketjen black, carbon fiber, and metal powders and metal fiber including copper, nickel, aluminum silver, and the like.

The compound may have a coating layer on the surface. The coating layer may include a compound such as oxide, hydroxide, oxyhydroxide, oxycarbonate, hydroxycarbonate, and combinations thereof including metal or semi-metal selected from Mg, Al, Co, K, Na, Ca, Si, Ti, V, Sn, Ge, Ga, B, As, Zr, or combinations thereof. The compound of a coating layer may be amorphous or crystalline.

The negative electrode 112 includes a current collector and a negative active material layer positioned on the current collector.

The current collector may be for example, a copper foil, a nickel foil, a stainless steel foil, a titanium foil, a nickel foam, a polymer substrate coated with a conductive metal, and combinations thereof.

The negative active material layer includes a negative active material, a binder, and a conductive material.

For the negative active material, a material that reversibly intercalates/deintercalates lithium ions, lithium, lithium alloy, a material capable of alloying with lithium, materials being doping and dedoping lithium, transition metal oxide, or combinations thereof may be used. The material that reversibly intercalates/deintercalates lithium ions includes carbon-based negative active materials.

The carbon-based negative active materials may be, for example, crystalline carbon, amorphous carbon, or combination thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, and so on.

The materials being capable of alloying with lithium includes an element such as, Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Examples of the transition elements oxide, compounds being doping and dedoping lithium, or compounds being capable of reversibly reacting lithium include for example, vanadium oxide, lithium vanadium oxide, Si, $SiO_x$ (0<x<2), Sn, $SnO_2$, composite tin alloys, and combinations thereof.

The binder and conductive material are the same as in described above.

The separator 113 may be a single layer or multilayer, for example made of polyethylene, polypropylene, polyvinylidene fluoride, or combinations thereof.

The electrolyte includes a lithium salt, a trialkylsilyl(meth)acrylate compound, a halogenated carbonate compound, and an organic solvent that are the same as described above.

Redundant description is omitted.

The following examples illustrate the present embodiments in more detail. These examples, however, should not in any sense be interpreted as limiting the scope of the present embodiments.

Preparation of Electrolyte

EXAMPLE 1

An electrolyte for a rechargeable lithium battery was prepared by adding 0.5 wt % of trimethylsilylacrylate (TMSA) and 3 wt % of fluoroethylene carbonate (FEC) to an organic solvent with 1.15M $LiPF_6$ dissolved therein. The organic solvent was prepared by mixing ethylene carbonate (EC): ethylmethyl carbonate (EMC):diethyl carbonate (DEC) at a ratio of about 1:1:1.

EXAMPLE 2

An electrolyte for a rechargeable lithium battery was prepared according to the same method as in Example 1, except that trimethylsilylacrylate (TMSA) was included in an amount of about 1 wt %.

EXAMPLE 3

An electrolyte for a rechargeable lithium battery was prepared according to the same method as in Example 2, except that fluoroethylene carbonate (FEC) was included in an amount of about 5 wt %.

EXAMPLE 4

An electrolyte for a rechargeable lithium battery was prepared according to the same method as in Example 3, except that trimethylsilylacrylate (TMSA) was included in an amount of about 3 wt %.

EXAMPLE 5

An electrolyte for a rechargeable lithium battery was prepared according to the same method as in Example 3, except that trimethylsilylacrylate (TMSA) was included in an amount of about 5 wt %.

EXAMPLE 6

An electrolyte for a rechargeable lithium battery was prepared according to the same method as in Example 1, except that fluoroethylene carbonate (FEC) was included in an amount of about 10 wt %.

COMPARATIVE EXAMPLE 1

An electrolyte for a rechargeable lithium battery was prepared by adding 1.15M of $LiPF_6$ to an organic solvent prepared by mixing ethylene carbonate (EC):ethylmethyl carbonate (EMC):diethyl carbonate (DEC) at a ratio of about 1:1:1.

COMPARATIVE EXAMPLE 2

An electrolyte for a rechargeable lithium battery was prepared according to the same method as in Comparative Example 1, except that trimethylsilylacrylate (TMSA) was further included to an amount of about 3 wt %.

COMPARATIVE EXAMPLE 3

An electrolyte for a rechargeable lithium battery was prepared according to the same method as in Comparative Example 1, except that fluoroethylene carbonate (FEC) was further included to an amount of about 3 wt %.

The electrolytes of Examples 1 to 6 and Comparative Examples 1 to 3 are shown in Table 1.

TABLE 1

|  | Additive (wt %) | |
|---|---|---|
|  | TMSA | FEC |
| Example 1 | 0.5 | 3 |
| Example 2 | 1 | 3 |
| Example 3 | 1 | 5 |
| Example 4 | 3 | 5 |
| Example 5 | 5 | 5 |
| Example 6 | 0.5 | 10 |
| Comparative Example 1 | 0 | 0 |
| Comparative Example 2 | 3 | 0 |
| Comparative Example 3 | 0 | 3 |

Fabrication of Rechargeable Lithium Battery Cells

Battery cells were fabricated by using $LiCoO_2$ and $Ni_{0.5}CO_{0.2}Mn_{0.3}$ as a positive active material, using artificial graphite as a negative active material, and using a polyethylene film as a separator. Subsequently, the electrolytes prepared according to Examples 1 to 6 and Comparative Examples 1 to 3 were injected into the battery cells respectively to thereby fabricate rechargeable lithium battery cells of about 1020 mAh capacity.

Performance Test 1

The rechargeable lithium battery cells fabricated in the above-described methods were charged and discharged 300 times and capacities. The $300^{th}$ capacity retention relative to initial capacity was measured.

Figure 2:
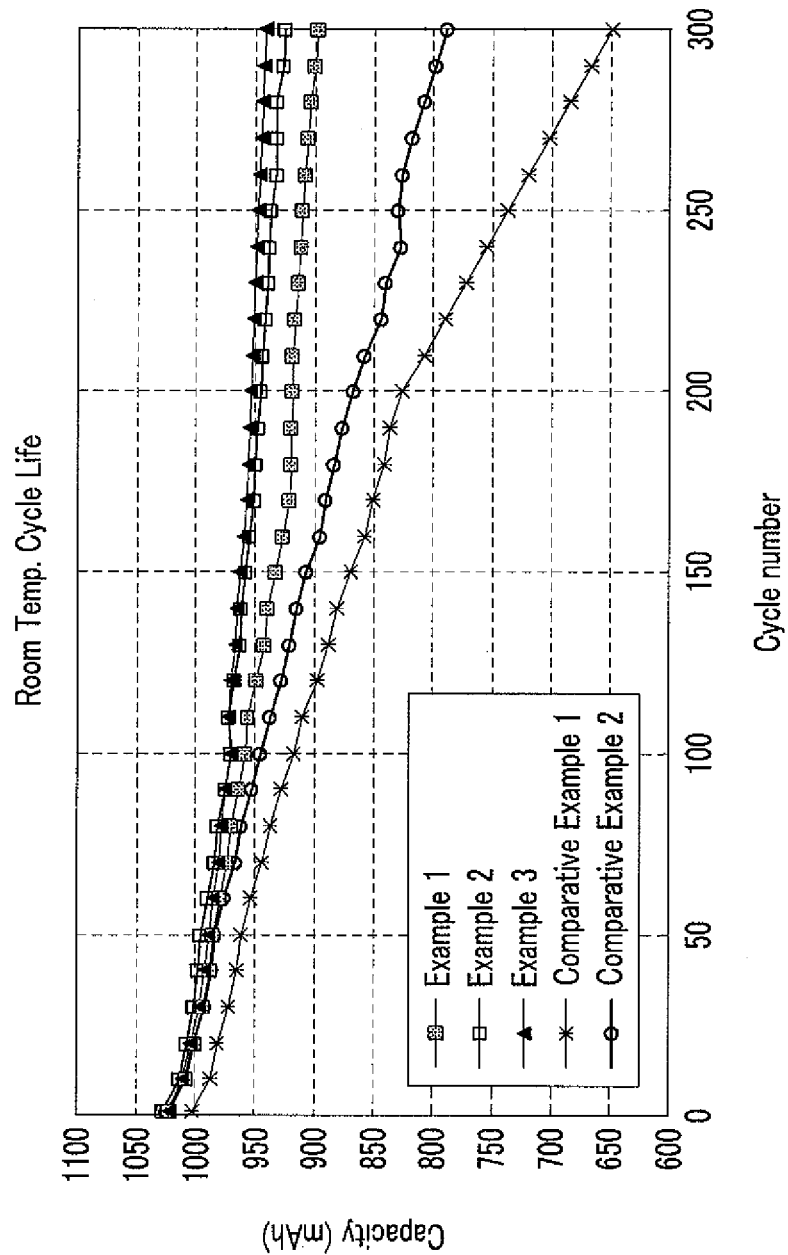
FIG. 2 is a graph showing capacities relative to cycle numbers of the rechargeable lithium battery cells according to Examples and Comparative Examples.
Figure 3:
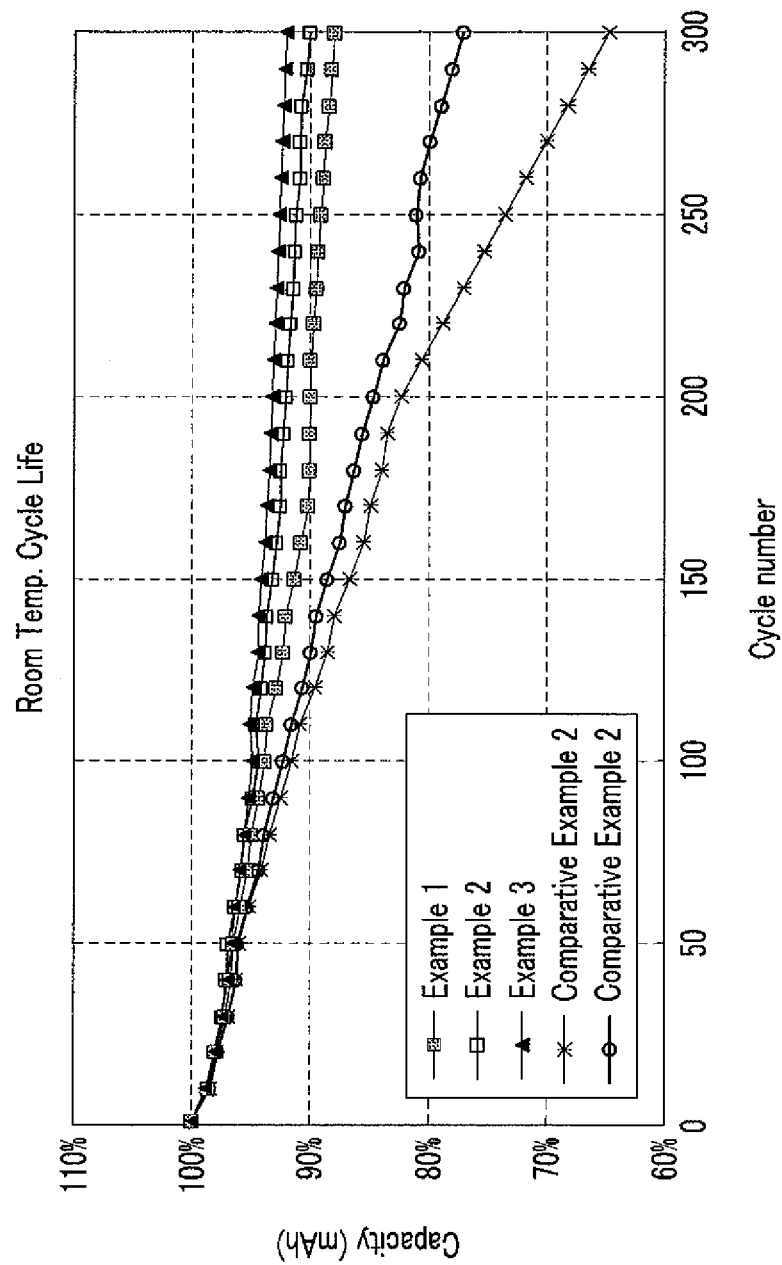
FIG. 3 is a graph showing capacity retention relative to cycle numbers of the rechargeable lithium battery cells according to Examples and Comparative Examples.

The results are shown in Table 2, and FIGS. 2 and 3.

TABLE 2

| No. | Capacity after 300 cycles (%) |
|---|---|
| Example 1 | 88 |
| Example 2 | 90 |
| Example 3 | 92 |
| Example 4 | 86 |
| Example 5 | 82 |
| Example 6 | 92 |
| Comparative Example 1 | 0 |
| Comparative Example 2 | 65 |
| Comparative Example 3 | 77 |

FIG. 2 is a graph showing capacities relative to cycle numbers of the rechargeable lithium battery cells according to Examples of the present embodiments and Comparative Examples, and FIG. 3 is a graph showing capacity retention relative to cycle numbers of the rechargeable lithium battery cells according to Examples of the present embodiments and Comparative Examples.

Referring to Table 2, and FIGS. 2 and 3, the rechargeable lithium battery cells including the electrolytes according to Examples 1 to 6 showed capacity retention of 80% or more and more improved capacity retention compared with those including the electrolytes according to Comparative Examples 1 to 3 after 300 times charge and discharge.

From the results, it is indicated that for additives, rechargeable lithium battery cells including electrolytes including trimethylsilylacrylate (TMSA) and fluoroethylene carbonate (FEC) according to Examples 1 to 6 showed more improved capacity retention compared with that including the electrolyte without the additives (Comparative Example 1) or those including the electrolytes either one of the additives (Comparative Examples 2 and 3).

Performance Test 2

The rechargeable lithium battery cells fabricated above were allowed to stand at about 60° C. for 30 days and capacity retention was measured.

The results are shown in Table 3.

TABLE 3

| No. | Capacity (%) |
|---|---|
| Example 1 | 81 |
| Example 2 | 86 |
| Example 3 | 85 |
| Example 4 | 80 |
| Example 5 | 76 |
| Example 6 | 74 |
| Comparative Example 1 | 50 |
| Comparative Example 2 | 48 |
| Comparative Example 3 | 64 |

As shown in Table 3, the rechargeable lithium battery cells including the electrolytes including trimethylsilylacrylate (TMSA) and fluoroethylene carbonate (FEC) according to Examples 1 to 6 showed high capacity compared with that including the electrolyte without the additives (Comparative Example 1) or those including the electrolytes with either one of the additives (Comparative Examples 2 and 3) after a long time.

While the embodiments have been described in connection with what is presently considered to be practical exemplary embodiments, it is to be understood that the embodiments are not limited to the disclosed embodiments, but, on the contrary, is intended to cover various modifications and equivalent arrangements included within the spirit and scope of the appended claims.

What is claimed is:

1. An electrolyte for a rechargeable lithium battery comprising
    a lithium salt,
    a trialkylsilyl(meth)acrylate compound represented by the following Chemical Formula 1, Chemical Formula 1

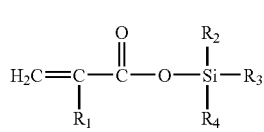

a fluoroethylene carbonate, and
an organic solvent;

wherein in the Chemical Formula 1, $R_1$ is hydrogen or methyl, and $R_2$ to $R_4$ are the same or different and each selected from $C_1$ to $C_6$ alkyl.

2. The electrolyte of claim 1, wherein the trialkylsilyl (meth)acrylate compound comprises trimethylsilylacrylate represented by the following Chemical Formula 2

Chemical Formula 2

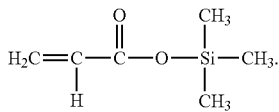

3. The electrolyte of claim 1, wherein the trialkylsilyl (meth)acrylate compound is included in an amount of from about 0.1 to about 5 wt% based on the total weight of the electrolyte.

4. The electrolyte of claim 1, wherein the fluoroethylene carbonate is included in an amount of from about 0.1 to about 10 wt% based on the total weight of the electrolyte.

5. A rechargeable lithium battery comprising
a positive electrode,
a negative electrode, and
an electrolyte including a lithium salt, a trialkylsilyl(meth)acrylate compound represented by the following Chemical Formula 1, Chemical Formula 1

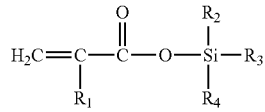

a fluoroethylene carbonate, and an organic solvent;
wherein in the Chemical Formula 1, $R_1$ is hydrogen or methyl, and $R_2$ to $R_4$ are the same or different and each selected from a $C_1$ to $C_6$ alkyl.

6. The rechargeable lithium battery of claim 5, wherein the trialkylsilyl(meth)acrylate compound comprises trimethylsilylacrylate represented by the following Chemical Formula 2.

Chemical Formula 2

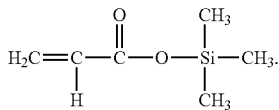

7. The rechargeable lithium battery of claim 5, wherein the trialkylsilyl(meth)acrylate compound is included in an amount of from about 0.1 to about 5 wt% based on the total weight of the electrolyte.

8. The rechargeable lithium battery of claim 5, wherein the fluoroethylene carbonate is included in an amount of from about, 0.1 to about 10 wt% based on the total weight of the electrolyte.

9. The rechargeable lithium battery of claim 5, wherein the positive electrode comprises a positive active material selected from the group consisting of $LiCoO_2$, a nickel-cobalt-manganese composite compound, and combinations thereof.

10. An electronic device comprising the rechargeable lithium battery of claim 5.

11. An electronic device comprising the rechargeable lithium battery of claim 6.

12. An electronic device comprising the rechargeable lithium battery of claim 7.

13. An electronic device comprising the rechargeable lithium battery of claim 8.

14. An electronic device comprising the rechargeable lithium battery of claim 9.

15. An electronic device comprising a rechargeable lithium battery comprising:
a positive electrode,
a negative electrode, and
an electrolyte including a lithium salt, a trialkylsilyl(meth)acrylate compound represented by the following Chemical Formula 2, Chemical Formula 2

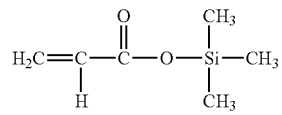

a halogenated carbonate compound, and an organic solvent,
wherein the halogenated carbonate compound comprises fluoroethylene carbonate.

16. The electronic device of claim 15, wherein the trialkylsilyl(meth)acrylate compound is included in an amount of from about 0.1 to about 5 wt% based on the total weight of the electrolyte.

17. The electronic device of claim 15, wherein the halogenated carbonate compound is included in an amount of from about 0.1 to about 10 wt% based on the total weight of the electrolyte.

* * * * *